(12) United States Patent
Wang et al.

(10) Patent No.: US 8,144,945 B2
(45) Date of Patent: Mar. 27, 2012

(54) METHOD, APPARATUS AND COMPUTER PROGRAM PRODUCT FOR PROVIDING AN ORIENTATION INDEPENDENT FACE DETECTOR

(75) Inventors: Kongqiao Wang, Beijing (CN); Jiangwei Li, Beijing (CN); Lei Xu, Beijing (CN)

(73) Assignee: Nokia Corporation, Espoo (FI)

( * ) Notice: Subject to any disclaimer, the term of this patent is extended or adjusted under 35 U.S.C. 154(b) by 776 days.

(21) Appl. No.: 12/328,375

(22) Filed: Dec. 4, 2008

(65) Prior Publication Data

US 2010/0142768 A1    Jun. 10, 2010

(51) Int. Cl.
G06K 9/48 (2006.01)
G06K 9/32 (2006.01)
G06F 21/00 (2006.01)
G05B 19/00 (2006.01)

(52) U.S. Cl. ........ 382/118; 382/199; 382/297; 716/186; 340/5.83

(58) Field of Classification Search .............. 382/107, 382/117, 118, 103, 224, 181, 275, 209, 162, 382/167, 165, 282, 159, 171, 164, 225, 195, 382/190, 199, 297; 348/42, 169, 14.07, 14.01, 348/14.1, 597, E9.04, 14.16, E5.031, E5.038, 348/E5.001, E17; 340/5.1, 5.8, 5.81, 5.82, 340/5.83; 713/182, 185, 186
See application file for complete search history.

(56) References Cited

U.S. PATENT DOCUMENTS

| | | | | |
|---|---|---|---|---|
| 7,035,456 | B2* | 4/2006 | Lestideau | 382/164 |
| 7,130,446 | B2* | 10/2006 | Rui et al. | 382/103 |
| 7,324,669 | B2* | 1/2008 | Nakanishi et al. | 382/118 |
| 7,565,030 | B2* | 7/2009 | Steinberg et al. | 382/296 |
| 7,689,033 | B2* | 3/2010 | Xiao et al. | 382/159 |
| 7,848,566 | B2* | 12/2010 | Schneiderman | 382/159 |
| 7,929,771 | B2* | 4/2011 | Ko et al. | 382/190 |
| 2005/0013479 | A1 | 1/2005 | Xiao et al. | |
| 2005/0150280 | A1 | 7/2005 | Li | |
| 2007/0009159 | A1 | 1/2007 | Fan | |
| 2007/0031041 | A1 | 2/2007 | Ko et al. | |
| 2008/0019575 | A1* | 1/2008 | Scalise et al. | 382/118 |
| 2008/0175447 | A1 | 7/2008 | Kim et al. | |
| 2008/0317379 | A1* | 12/2008 | Steinberg et al. | 382/275 |
| 2009/0067730 | A1* | 3/2009 | Schneiderman | 382/224 |

OTHER PUBLICATIONS

Miao, J. et al., *A New Approach to Edge Extraction by Image Decomposition and Restoration*, 4 pages, 2000.
Hielmås, E. et al., *Face Detection: A Survey*, Computer Vision and Image Understanding, 83, 2001, pp. 236-274, Apr. 17, 2001.

(Continued)

*Primary Examiner* — Sheela Chawan
(74) *Attorney, Agent, or Firm* — Alston & Bird LLP

(57) ABSTRACT

A method for providing orientation independent face detection may include generating multiple mosaic images from an input image in which each of the multiple mosaic images has a different scale, employing a plurality of differently oriented edge detectors to perform edge detection on the multiple mosaic images including combining edges of the multiple mosaic images having the different scales, and performing face detection in regions corresponding to the differently oriented edge detectors based on respective feature maps produced by the differently oriented edge detectors. An apparatus and computer program product corresponding to the method are also provided.

20 Claims, 10 Drawing Sheets

OTHER PUBLICATIONS

Froba, B. et al., *Real-Time Face Detection*, Proceedings of the Fourth IASTED International Conference Signal and Image Processing, ACTA Press, 2002, pp. 497-502.

Phimoltares, S. et al., *Face Detection and Facial Feature Localization Without considering the Appearance of Image Context*, Image and Vision Computing, vol. 25, No. 5, May 2007, pp. 741-753.

Xiao, R. et al., *Robust Multipose Face Detection in Images*, IEEE Transactions on Circuits and Systems for Video Technology, vol. 14, No. 1, Jan. 2004, pp. 31-41.

Wu B. et al., *Fast Rotation Invariant Multi-View Face Detection Based on Real Adaboost*, Proceedings Sixth IEEE International Conference on Automatic Face and Gesture Recognition, IEEE Comput. Soc., 2004, pp. 79-84.

Wu, J. et al., *Efficient Face Candidates Selector for Face Detection*, Pattern Recognition, vol. 36, No. 5, May 2003, pp. 1175-1186.

International Search Report and Written Opinion for International Appl. No. PCT/IB2009/007619 mailed Mar. 26, 2010.

\* cited by examiner

METHOD, APPARATUS AND COMPUTER PROGRAM PRODUCT FOR PROVIDING AN ORIENTATION INDEPENDENT FACE DETECTOR

TECHNOLOGICAL FIELD

Embodiments of the present invention relate generally to image processing technology and, more particularly, relate to a method, apparatus and computer program product for providing orientation independent face detection.

BACKGROUND

Face detection and recognition is becoming an increasingly more important technology. In this regard, for example, face detection may be useful in biometrics, user interface, and other areas such as creating context for accessing communities in the mobile domain. Face detection may also be important going forward in relation to initiatives such as metadata standardization.

Although face detection techniques continue to improve, many current methods require either a high computation capability (e.g., statistical methods of detecting faces by scanning images in a traversing way on multiple scales) or suffer from limited face detection performance (e.g., structure-based methods with relatively high false alarms of face detection). Furthermore, some statistical face detection mechanisms have degraded performance for multi-view face detection in relation to front face detection. As another complicating issue, faces encountered in a particular image may not always be oriented in the same direction relative to the camera, which could negatively impact face detection. For example, in-plane rotation (e.g., faces that are rotated along the axis from the face to the observer) may complicate face detection in some cases.

Accordingly, the tendency for developing devices with continued increases in their capacity to create content, store content and/or receive content relatively quickly upon request, the trend toward electronic devices (e.g., mobile electronic devices such as mobile phones) becoming increasingly ubiquitous in the modern world, and the drive for continued improvements in interface and access mechanisms to unlock the capabilities of such devices, may make it desirable to provide further improvements in the area of face detection.

BRIEF SUMMARY OF SOME EXAMPLES

A method, apparatus and computer program product are therefore provided to enable an orientation independent face detection mechanism. For example, in some exemplary embodiments, a mechanism is provided that is capable of detecting faces over a 360 degree span of possible in-plane rotation angles. Moreover, in some cases, example embodiments provide a relatively fast and robust multi-view face detection mechanisms by utilizing a structure-based detection scheme with a verification operation that employs a statistical method (e.g., Adaboost (adaptive boosting) based statistical verification) for reducing the incidence of false alarms. As such, some embodiments provide for an ability to detect face candidates with a multi-scale and multi-level structure-based detection method that then employ multiple face detectors for verification (e.g., using Adaboost face detectors with a strong competence for detecting front faces and 90 degree out-of-plane rotation faces) of face candidates after rotating the candidates to verticality referring to a line connecting two detected eyes.

In an exemplary embodiment, a method of providing orientation independent face detection is provided. The method may include generating multiple mosaic images from an input image in which each of the multiple mosaic images has a different scale, employing a plurality of differently oriented edge detectors to perform edge detection on the multiple mosaic images including combining edges of the multiple mosaic images having the different scales, and performing face detection in regions corresponding to the differently oriented edge detectors based on respective feature maps produced by the differently oriented edge detectors.

In another exemplary embodiment, a computer program product for providing orientation independent face detection is provided. The computer program product includes at least one computer-readable storage medium having computer-executable program code instructions stored therein. The computer-executable program code instructions may include program code instructions for generating multiple mosaic images from an input image in which each of the multiple mosaic images has a different scale, employing a plurality of differently oriented edge detectors to perform edge detection on the multiple mosaic images including combining edges of the multiple mosaic images having the different scales, and performing face detection in regions corresponding to the differently oriented edge detectors based on respective feature maps produced by the differently oriented edge detectors.

In another exemplary embodiment, an apparatus for providing orientation independent face detection is provided. The apparatus may include a processor. The processor may be configured to generate multiple mosaic images from an input image in which each of the multiple mosaic images has a different scale, employ a plurality of differently oriented edge detectors to perform edge detection on the multiple mosaic images including combining edges of the multiple mosaic images having the different scales, and perform face detection in regions corresponding to the differently oriented edge detectors based on respective feature maps produced by the differently oriented edge detectors.

In yet another exemplary embodiment, an apparatus for providing orientation independent face detection is provided. The apparatus may include means for generating multiple mosaic images from an input image in which each of the multiple mosaic images has a different scale, means for employing a plurality of differently oriented edge detectors to perform edge detection on the multiple mosaic images including combining edges of the multiple mosaic images having the different scales, and means for performing face detection in regions corresponding to the differently oriented edge detectors based on respective feature maps produced by the differently oriented edge detectors.

Embodiments of the invention may provide a method, apparatus and computer program product for employment, for example, in mobile or fixed environments. As a result, for example, computing device users may enjoy an improved capability for face detection.

BRIEF DESCRIPTION OF THE SEVERAL VIEWS OF THE DRAWING(S)

Having thus described some embodiments of the invention in general terms, reference will now be made to the accompanying drawings, which are not necessarily drawn to scale, and wherein:

DETAILED DESCRIPTION OF SOME EMBODIMENTS OF THE INVENTION

Figure 1:
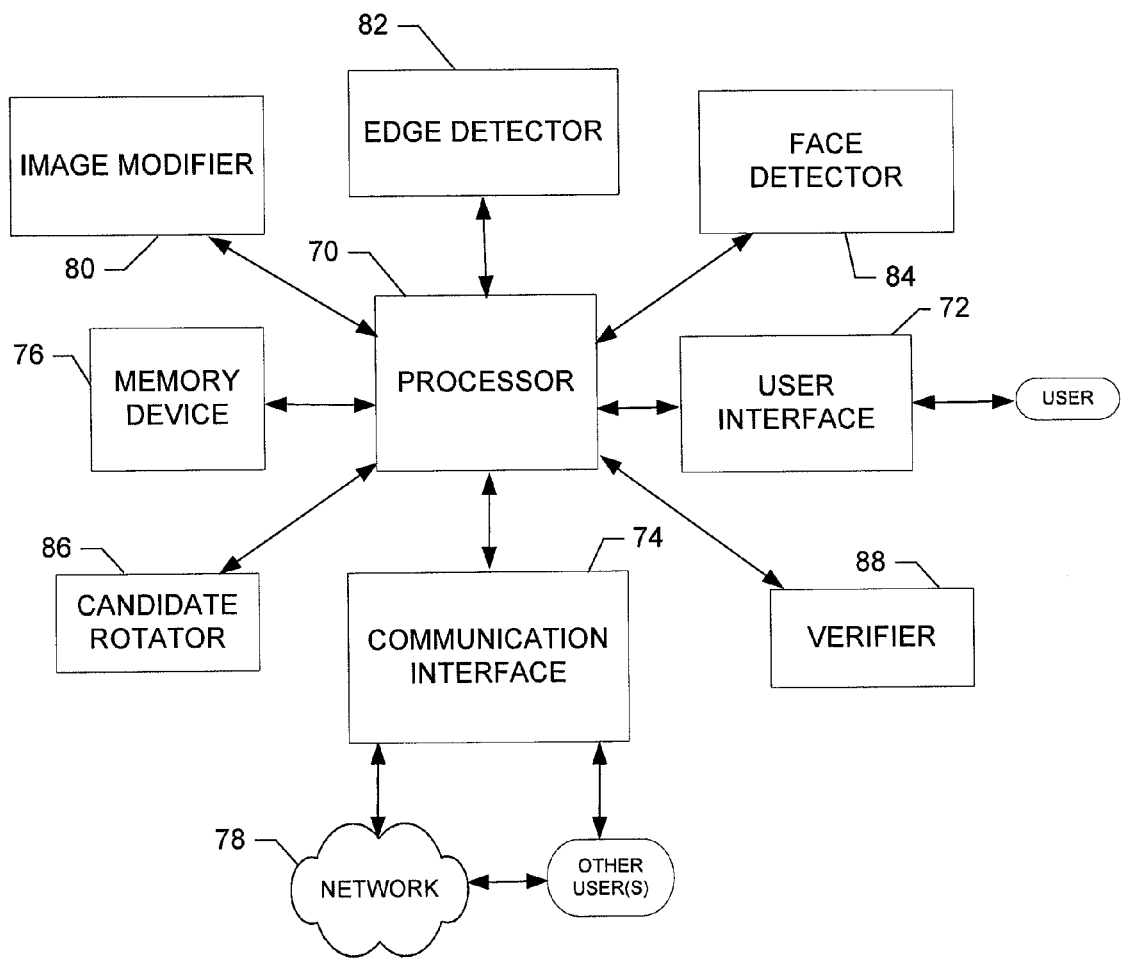
FIG. 1 illustrates one example of a schematic block diagram of an apparatus for enabling orientation independent face detection according to an exemplary embodiment of the present invention.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Additionally, the terms near and far are used herein in the relative sense so as to refer to objects being closer and further from some point with respect to one another, but not to otherwise represent any particular or quantifiable position. Thus, use of any such terms should not be taken to limit the spirit and scope of embodiments of the present invention.

Some embodiments of the present invention may provide a mechanism by which improvements may be experienced in relation to face detection. In this regard, for example, some embodiments may provide for a real-time or near real-time face detection scheme, which may be suitable for metadata assignment, biometrics and numerous other activities on hand-held or other computing devices.

FIG. 1 illustrates one example of a schematic block diagram of an apparatus for enabling orientation independent face detection according to an exemplary embodiment of the present invention. An exemplary embodiment of the invention will now be described with reference to FIG. 1, in which certain elements of an apparatus for enabling orientation independent face detection are displayed. The apparatus of FIG. 1 may be employed, for example, on a mobile terminal (e.g., the mobile terminal 10 of FIG. 11) or a variety of other devices, both mobile and fixed (such as, for example, a network device, personal computer, laptop computer, or the like). Alternatively, embodiments may be employed on a combination of devices. Accordingly, some embodiments of the present invention may be embodied wholly at a single device (e.g., the mobile terminal 10) or by devices in a client/server relationship. Furthermore, it should be noted that the devices or elements described below may not be mandatory and thus some may be omitted in certain embodiments.

Referring now to FIG. 1, an apparatus for enabling orientation independent face detection is provided. The apparatus may include or otherwise be in communication with a processor 70, a user interface 72, a communication interface 74 and a memory device 76. The memory device 76 may include, for example, volatile and/or non-volatile memory. The memory device 76 may be configured to store information, data, applications, instructions or the like for enabling the apparatus to carry out various functions in accordance with exemplary embodiments of the present invention. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases that store information and/or media content.

The processor 70 may be embodied in a number of different ways. For example, the processor 70 may be embodied as various processing means such as a processing element, a coprocessor, a controller or various other processing devices including integrated circuits such as, for example, an ASIC (application specific integrated circuit), an FPGA (field programmable gate array), a hardware accelerator, or the like. In an exemplary embodiment, the processor 70 may be configured to execute instructions stored in the memory device 76 or otherwise accessible to the processor 70. As such, whether configured by hardware or software methods, or by a combination thereof, the processor 70 may represent an entity capable of performing operations according to embodiments of the present invention while configured accordingly.

Meanwhile, the communication interface 74 may be any means such as a device or circuitry embodied in either hardware, software, or a combination of hardware and software that is configured to receive and/or transmit data from/to a network and/or any other device or module in communication with the apparatus. In this regard, the communication interface 74 may include, for example, an antenna (or multiple antennas) and supporting hardware and/or software for enabling communications with a wireless communication network (e.g., network 78). In fixed environments, the communication interface 74 may alternatively or also support wired communication. As such, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen, a microphone, a speaker, or other input/output mechanisms. In an exemplary embodiment in which the apparatus is embodied as a server or some other network devices, the user interface 72 may be limited, or eliminated. However, in an embodiment in which the apparatus is embodied as a mobile terminal, the user interface 72 may include, among other devices or elements, any or all of a speaker, a microphone, a display, and a keyboard or the like.

In an exemplary embodiment, the processor 70 may be embodied as, include or otherwise control an image modifier 80, an edge detector 82, a face detector 84, a candidate rotator 86 and a verifier 88. The image modifier 80, the edge detector 82, the face detector 84, the candidate rotator 86 and the verifier 88 may each be any means such as a device or circuitry embodied in hardware, software or a combination of hardware and software (e.g., processor 70 operating under software control, the processor 70 embodied as an ASIC or FPGA specifically configured to perform the operations described herein, or a combination thereof) that is configured to perform the corresponding functions of the image modifier 80, the edge detector 82, the face detector 84, the candidate rotator 86 and the verifier 88, respectively, as described below.

In an exemplary embodiment, any or all of the image modifier 80, the edge detector 82, the face detector 84, the candidate rotator 86 and the verifier 88 may include instructions, code, modules, applications and/or circuitry for providing respective portions of face detection services. However, it should be noted that code, circuitry and/or instructions associated with the image modifier 80, the edge detector 82, the face detector 84, the candidate rotator 86 and the verifier 88 need not necessarily be modular. In some embodiments, communication between the image modifier 80, the edge detector 82, the face detector 84, the candidate rotator 86 and the verifier 88 is conducted via the processor 70. However, the image modifier 80, the edge detector 82, the face detector 84, the candidate rotator 86 and the verifier 88 are alternatively in direct communication with each other or may have no communication with each other in other embodiments.

In an exemplary embodiment, the image modifier 80 modifies an input image from pixel-level data to feature-level data so the edge detector 82 can perform edge detection on feature-level data. The face detector 84 then detects face candidates using an elastic face template as described below, which may detect faces over a 360 degree span of in-plane rotation. After candidate faces have been detected, the candidate rotator 86 may rotate the detected candidates to vertical after which the verifier 88 may verify whether the candidates correspond to faces.

In an exemplary embodiment, the image modifier 80 may be in communication with a media capturing module (e.g., the camera module 37 of FIG. 11) to receive image data for use in analysis as described below. However, in alternative embodiments, the image modifier 80 may receive images from a storage location (e.g., the memory device 76) or another device. The image modifier 80 may be configured to mosaicize an input image. In this regard, the image modifier 80 of some embodiments is configured to convert pixel-level data in the image to feature-level data.

Figure 2:
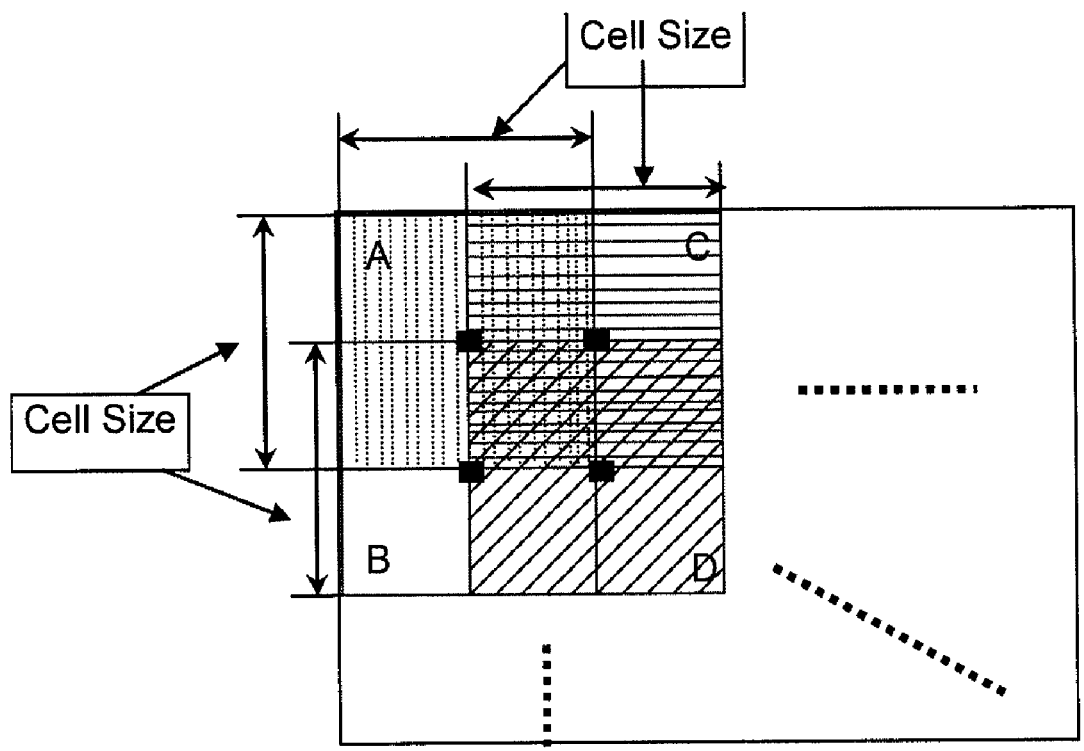
FIG. 2 shows an example of mosaicizing an input image according to an exemplary embodiment of the present invention.

FIG. 2 shows an example of mosaicizing an input image according to an exemplary embodiment. In this regard, as an example, the image modifier 80 is configured to build multiple scale mosaic images from the input image (e.g., the original image). In some cases, four scales referring to 2×2, 4×4, 6×6 and 8×8 mosaic cell sizes, respectively, may be employed. As shown in FIG. 2, values of each mosaic cell may be calculated by averaging values of all pixels of the input image that are in the respective defined cell window. Due to strong correlation between any two neighboring mosaic cells, it may be desirable to consider the overlapping by a certain percentage between the cells when calculating the average values. For example, each of the mosaic cells A, B, C and D in FIG. 2 may have more or less overlapping parts with certain others (e.g., cell A overlaps with each of cell B and cell C by 50%, but overlaps with cell D by only 25%). Thus, according to an exemplary embodiment, mosaicizing the image using the image modifier 80 efficiently removes facial detail textures and emphasizes larger facial features (e.g., eyes, mouth, and facial boundaries), because a mosaic image is composed of mosaic cells instead of pixels.

Figure 3:
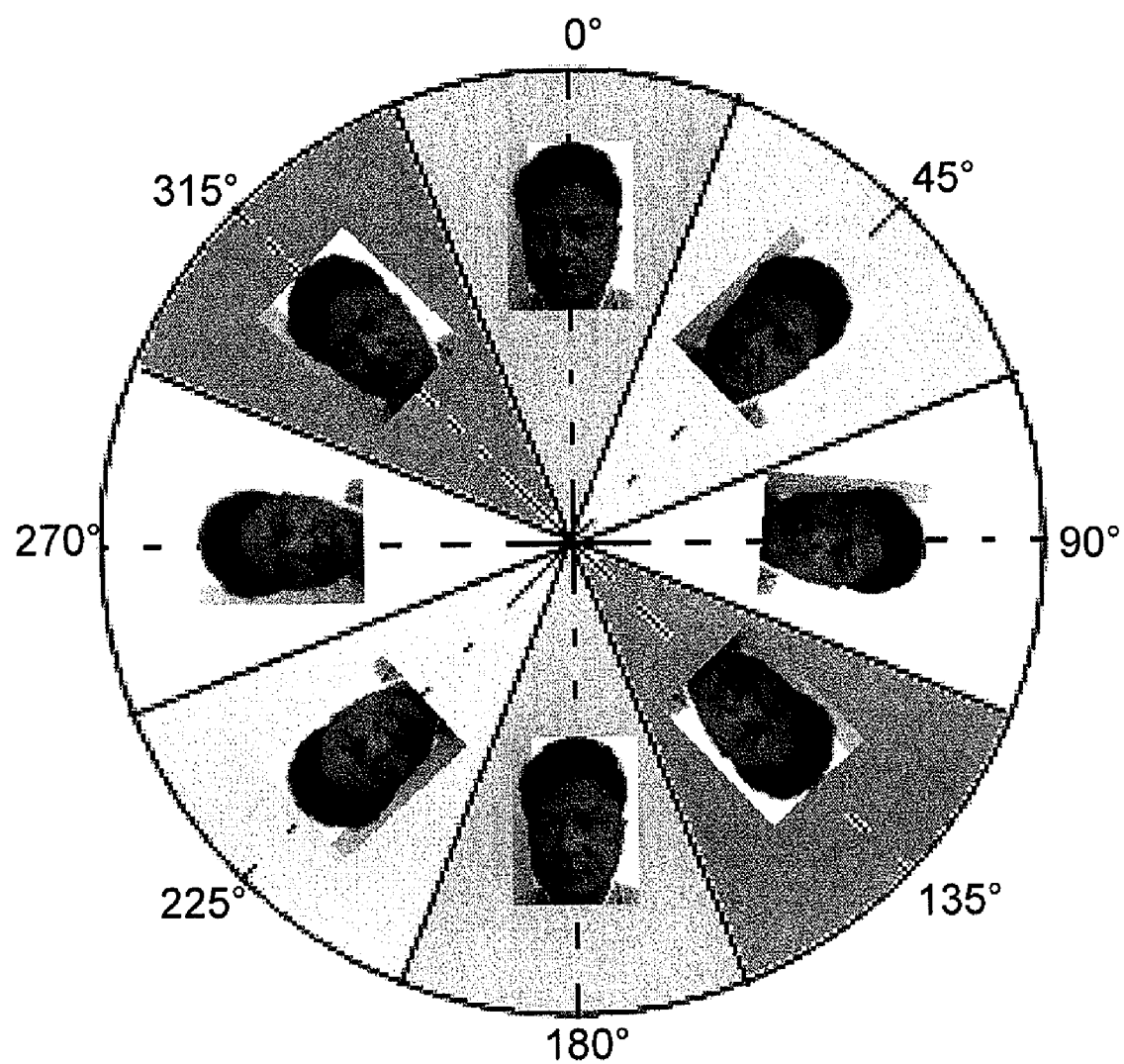
FIG. 3 shows an example of sector coverage of four edge detectors oriented to provide full span coverage for in-plane rotations according to an exemplary embodiment of the present invention.

The mosaicized input image including various scales that is produced by the image modifier 80 may be communicated to the edge detector 82. In some embodiments, the edge detector 82 is configured to binarize the different mosaic scale images in order to detect edge features. As such, in an exemplary embodiment, the edge detector 82 may act as a multi-scale and multi-level edge feature detector. In this regard, for example, four edge detectors may be employed in one embodiment in which the four edge detectors are oriented at 0 degrees, 45 degrees, 90 degrees, and 135 degrees. Having four edge detectors oriented in this manner may provide for accurate edge detection over a wide span of orientations (e.g., over 360 degrees). FIG. 3 shows an example of how four edge detectors oriented as described above may provide full span coverage for in-plane rotations. As shown in the example of FIG. 3, the 0 degree oriented edge detector is employed to detect faces from a range of about 337.5 degrees to 22.5 degrees and from about 157.5 degrees to 202.5 degrees. The 45 degree oriented edge detector is employed to detect faces from a range of about 22.5 degrees to 67.5 degrees and from about 202.5 degrees to 247.5 degrees. The 90 degree oriented edge detector is employed to detect faces from a range of about 67.5 degrees to 112.5 degrees and from about 247.5 degrees to 292.5 degrees. Finally, the 135 degree oriented edge detector is employed to detect faces from a range of about 112.5 degrees to 157.5 degrees and from about 292.5 degrees to 337.5 degrees. However, it should be noted that the embodiment of FIG. 3 is merely one example of the edge detector's possible orientations and other orientations configured to cover a 360 degree span could alternatively be employed.

In general, by taking a vertical human face as an example, the eyes and mouth on the face may present as concave horizontal features in low resolution. Accordingly, it may be possible to extract faces by detecting features and trying to group them in a pattern that fits the expected pattern of the eyes and mouth of the face. A face region may therefore be identified if some of the features present in an image match a predefined facial structure having the expected pattern. In practical situations, faces may have any number of different in-plane rotations that may complicate the above described process. Accordingly, employment of edge detectors in various different orientations, as described above, may provide for coverage of all possible in-plane rotation angles. In the example above, each edge detector is configured to cover two 45 degree swaths oriented 180 degrees out from each other. Accordingly, it may be possible to create 4*ML edge feature maps if there are ML binarization levels. Because the edge features are determined as a result of combining edges of multiple scales, each edge feature may roughly reflect the direction and shape of the feature object being analyzed.

Figure 4:
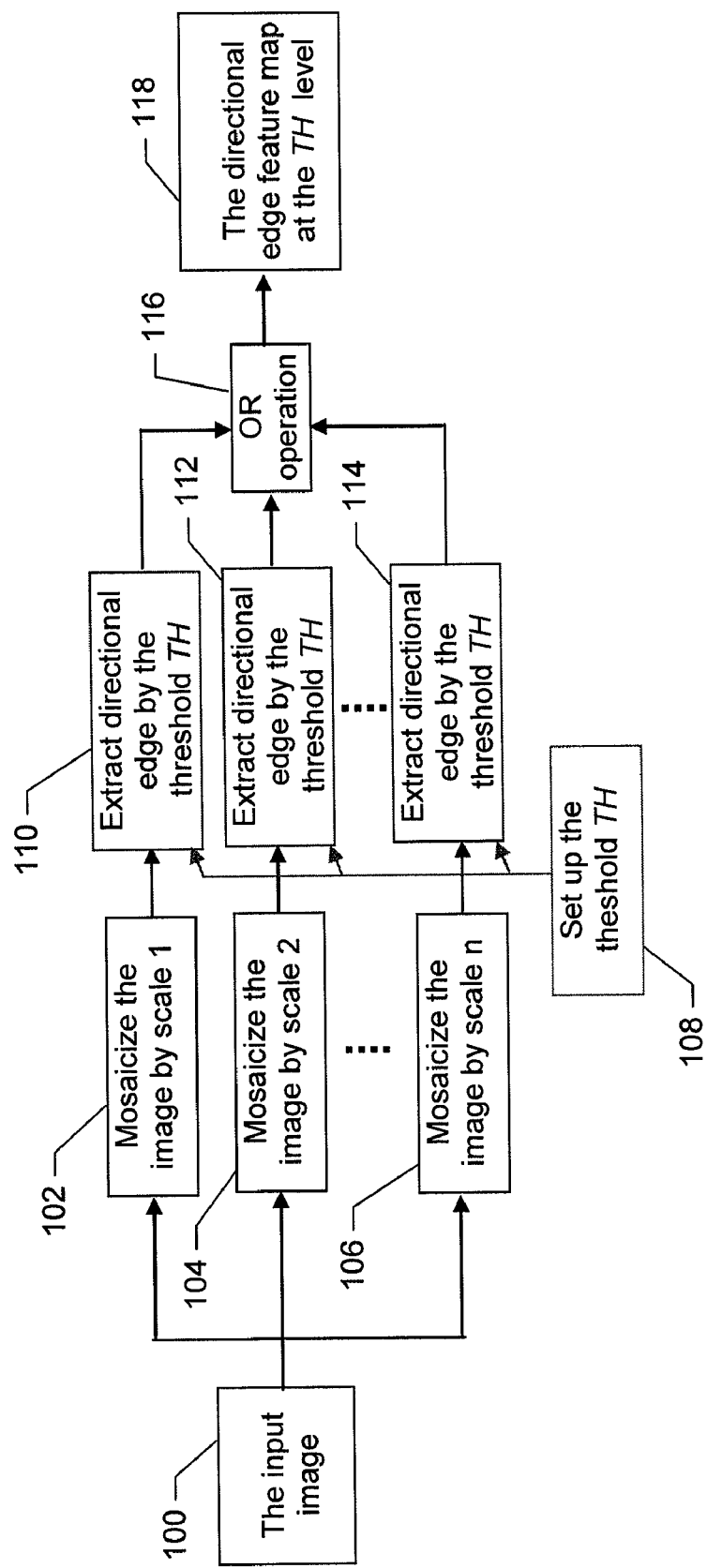
FIG. 4 shows a block diagram illustrating combined operations of an image modifier and an edge detector of an exemplary embodiment of the present invention.

FIG. 4 shows a block diagram illustrating the combined operations of the image modifier 80 and the edge detector of an exemplary embodiment. In this regard, the input image 100 may be mosaicized by the image modifier 80 to produce various different mosaicized image scales. For example, the image modifier 80 may mosaicize the image by a scale of 1 as shown at operation 102, by a scale of 2 as shown at operation 104, and by any number of additional scales down to a scale of n as shown by operation 106. A threshold TH may then be established by the edge detector 82 at operation 108. At operation 110, directional edges may be extracted based on comparing the mosaicized image by the scale of 1 to the threshold TH. At operations 112 and 114, respectively, directional edges may be extracted based on the threshold TH for each respective scale (e.g., 2 and n). The edge detector 82, in some cases, also binarizes all mosaic images (e.g., via 0-255 grayscales) filtered by directional edge operators, respectively, to get corresponding binary edge maps (e.g., corresponding to the 0 degree, 45 degree, 90 degree and 135 degree edge detectors). In some embodiments, binarization may be set for different levels (e.g., grayscale values equal to 20, 40 and 60) for different scales. The output corresponding to each scale may then be processed with a logical OR operation 116 to provide a directional edge feature map at the threshold TH level at operation 118. As such, for example, the edge feature maps may be created by combining all corresponding edge maps of different scales at the same binarization level. Directional edge feature maps may therefore be created by corresponding directional edge images at the same level through the OR operation 116.

Figure 5C:
FIG. 5C shows an example of a face detection result according an exemplary embodiment of the present invention.
Figure 5B:
FIG. 5B illustrates an example of a 0 degree directional edge feature map of the original image at a grayscale binarization level of 60 according an exemplary embodiment of the present invention.
Figure 5A:
FIG. 5A shows an example of an image that may be input into an embodiment of the present invention as an original image according an exemplary embodiment of the present invention.

FIG. 5A shows an example of an image that may be input into an embodiment of the present invention as an original image. FIG. 5B illustrates an example of a 0 degree directional edge feature map of the original image at a grayscale binarization level of 60. FIG. 5C shows an example of a face detection result (e.g., by the face detector 84), which will be described in greater detail below.

Figure 6B:
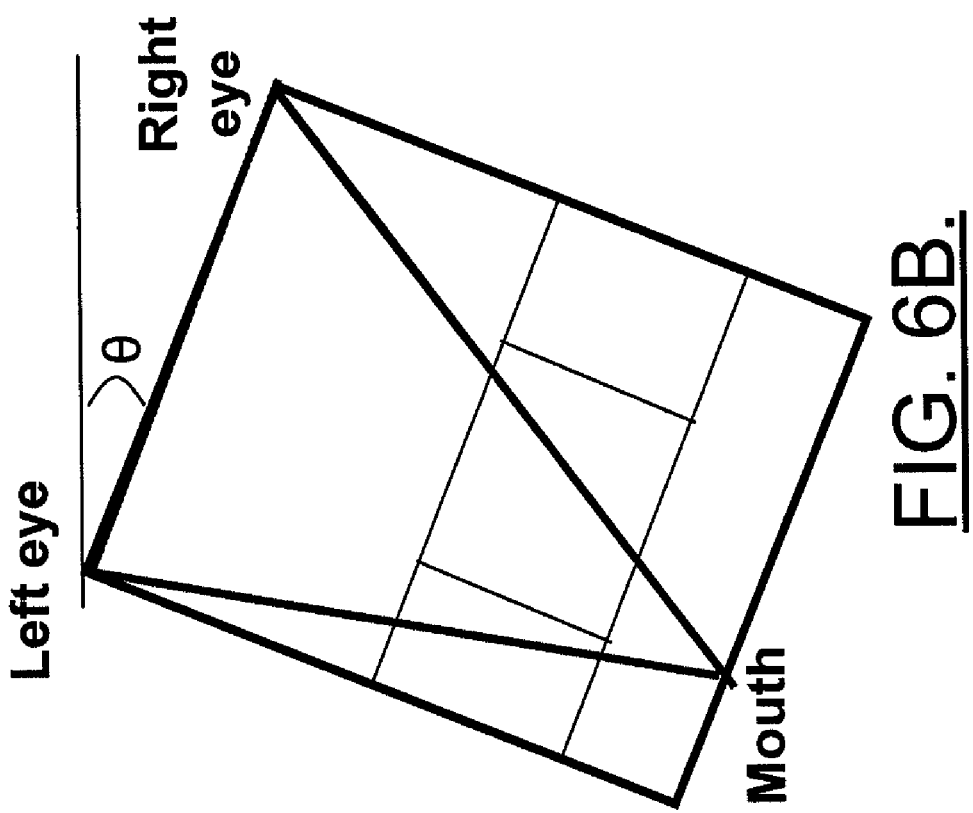
FIG. 6 (including FIGS. 6A through 6B) illustrates examples of an elastic face template according to an exemplary embodiment of the present invention.
Figure 6A:
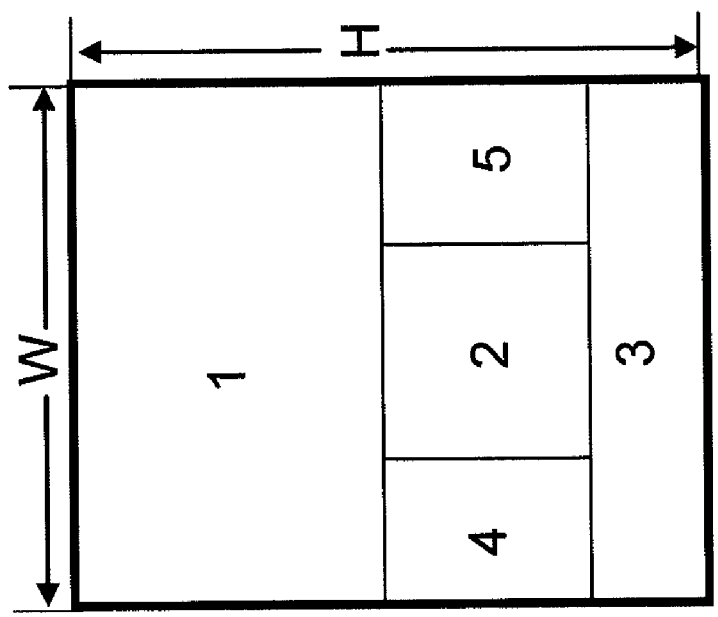

In an exemplary embodiment, the face detector 84 is configured to employ a template based face recognition mechanism. In some examples, the face detector 84 may be considered to apply an elastic or flexible face detection process. In this regard, for example, an elastic face template may be defined for detecting face candidates on the directional edge feature maps provided by the edge detector 82. The elastic face template is defined based on the specific structure of the human face. For example, the eyes and mouth of a human face (when both eyes are visible) form a triangle as shown in FIG. 5C. FIG. 6 (which includes FIGS. 6A and 6B) shows an example of an elastic face template according to an exemplary embodiment. FIG. 6A shows five portions or blocks forming the elastic template according to one example. The five blocks may include an upface block (1), a nostril block (2), an uplip block (3), and left and right cheek blocks ((4) and (5), respectively). Thus, the blocks of the elastic template may assist in locating the nose and mouth on a face candidate based on the initial detection of a pair of eyes. The elastic template is considered flexible or elastic, because the width (W) and the height (H) of the template are not fixed. Instead, the width (W) of the template may be determined by the distance between the eyes in the detected pair of eyes. The height (H) may be determined based on the distance between the mouth (or possible mouth) and a line connecting the pair of eyes. FIG. 6B shows the elastic template applied to a pair of eyes and a mouth in which the pair of eyes have θ degrees of in-plane rotation.

In an exemplary embodiment, the face detector 84 is configured to first look for a pair of eyes. After locating a pair of eyes, the face detector 84 according to this example is configured to attempt to determine a face candidate by applying the elastic template to the located pair of eyes (or potential pair of eyes). In this regard, for example, after locating the pair of eyes, the face detector 84 may determine the width of the elastic face template based on the distance between the eyes. The orientation of the eyes in relation to each other is indicative of the in-plane rotation angle (e.g., θ in FIG. 6B) and may also be determined by the face detector 84. In this regard, for example, the elastic template may be rotated to ensure a top side of the elastic template aligns with the connection line between the eyes. Additionally, the center of the left eye and the center of the right eye may each be positioned to the top-left and top-right corners of the elastic template, respectively (see FIG. 6B for an example of a rotated elastic template). However, in some cases, detection performance may be improved by utilizing a directional edge feature maps having a span that includes the slant angle of the determined eye pair (θ). In this regard, for example:
1) while −22.5°<θ<22.5° (0°<θ<22.5° or 337.5°<θ<360°) or 157.5°<θ<202.5°, face detection is approached on the 0° directional edge feature maps;
(2) while 22.5°<θ<67.5° or 202.5°<θ<247.5°, face detection is approached on the 45° directional edge feature maps;
(3) while 67.5°<θ<112.5° or 247.5°<θ<292.5°, face detection is approached on the 90° directional edge feature maps; and
(4) while 112.5°<θ<157.5° or 292.5°<θ<337.5°, face detection is approached on the −45° directional edge feature maps.

The operation of the face detector 84 over each respective one of the edge feature maps provided from the edge detector 82 enables the face detector 84 to detect all face candidates over the entire 360 degree span of possible in-plane rotation angles. Moreover, operation of the face detector 84 over an edge feature map corresponding to a span that covers the in-plane rotation angle of the eye pair provides improved performance in some cases.

The face detector 84 may also be configured to determine the height (H) of the elastic template while locating a face candidate. In this regard, for example, if it is assumed that there are N1, N2, N3, N4, and N5 edge features included in regions 1, 2, 3, 4, and 5 of the elastic template, respectively, a face region can be confirmed if the following conditions are met:

$$\frac{H}{W} > 0.6 \text{ and } \frac{W}{H} > 0.6 \text{ and} \quad (1)$$

$$N1 < 2 \text{ and } N2 < 3 \text{ and } N3 = N4 = N5 = 0. \quad (2)$$

The face detector 84 may present an advantage in that the face detector 84 may be able to directly detect faces over a 360° span on directional edge feature maps with the elastic template. As indicated above, FIG. 5C shows an example of face detection results utilizing the face detector 84 of an exemplary embodiment. Since face detection is processed on directional edge feature maps from the edge detector 82, and the number of the involved edged features is relatively limited, processing may involve much less than the number of original image pixels and thus detection speed may be increased. Despite this improvement, since the edge feature maps may in some cases only have image structure information, without texture details of the original image, it is possible that face false alarms may be experienced in some instances. Accordingly, the verifier 88 may be used to screen data and reduce false detections.

The verifier 88 may be configured to perform verification operations in order to verify whether a possible detection is to be considered to actually correlate to a face detection. In an exemplary embodiment, the verifier 88 may employ Adaboost technology for verification purposes. However, Adaboost is merely one example of a specific implementation of the verifier 88 and other mechanisms may alternatively be employed. Adaboost (adaptive boost) is a machine learning algorithm that may be utilized in conjunction with other learning mechanisms (e.g., the face detection mechanism performed by the image modifier 80, the edge detector 82 and the face detector 84 described above) to improve performance.

Figure 7:
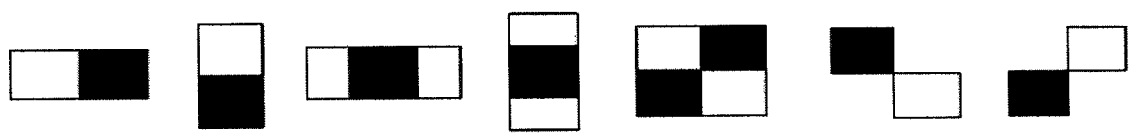
FIG. 7 shows examples of seven different haar-like features that may be employed in connection with an exemplary embodiment of the present invention.

Embodiments of the present invention may, in some cases, modify the verifier 88 to provide a new definition for feature space with respect to Adaboost. In this regard, for example, the real-time computation of Adaboost may come from simple feature structures and the use of an integral image. Adaboost may typically be used in conjunction with four kinds of defined haar-like features, values of which can be rapidly computed using integral images. Some embodiments of the present invention expand this to define seven kinds of features (shown by way of example in FIG. 7). These extended features may enable the provision of more flexible choices to code intrinsic facial structures, so that there may be less weak classifiers needed for predefined performance. Additionally, generalization of performance may also be provided, because the presented features may also have simple structures.

Figures 8A, 8B:
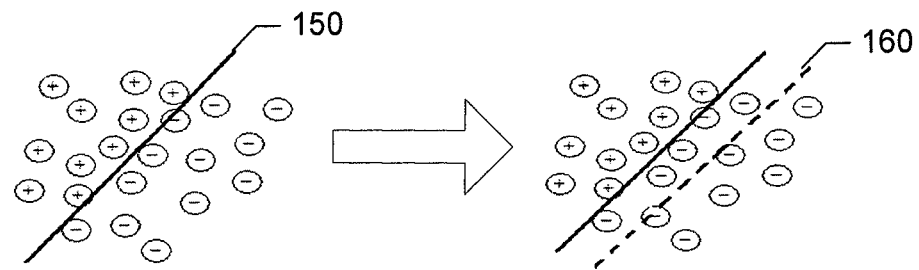
FIG. 8 illustrates a punishment scheme for use in bootstrapping according to an exemplary embodiment of the present invention.

Embodiments of the present invention may also, in some cases, introduce a punishment scheme in bootstrapping. In this regard, for example, Adaboost cascade training may use bootstrapping to collect new positive and negative samples for a next cascade. Meanwhile, some embodiments of the present invention introduce a punishment coefficient into bootstrapping. In this regard, for example, given an image patch x (e.g., a negative sample, after it passes through the previous and existing cascades), the output score of the image patch may be $C(x)$. If the score is greater than a given threshold a ($C(x)>a$), the image patch may be determined to be a new training sample. However, as shown in FIG. 8A, if some positive and negative samples are very close to the cascade margin 150, the classification may be unreliable considering image noises. To solve this problem of unreliability, the boundary may be loosened (as indicated by boundary 152 in FIG. 8B) in order to leak more samples with output values more than $(a-a0)$ but less than a, where a0 is a positive constant, namely a punishment coefficient. Using this strategy, negative samples with low confidences may be retrained for the next cascade to ensure more reliable performance. In an exemplary embodiment, a0 may be set to 0.001, while a is defined by FAR (false acceptance rate) and FRR (false rejection rate) each of which may also be set to 0.001) in the corresponding cascade.

In an exemplary embodiment, the verifier 88 may include or be preceded by the candidate rotator 86, which may be configured to rotate each candidate vertically based on the in-plane rotation angle. The vertically rotated candidate may then be operated on by the verifier 88 (e.g., by a modified Adaboost verifier as described above) for further verification. In some embodiments, three verifiers may be utilized for verifying cases with −45 degree, 0 degree, +45 degree out-of-plane rotation angles, respectively. If a face candidate can pass one of the verifiers, the candidate face may be considered to be a real face for output. Meanwhile, the direction of the face (e.g., in-plane and out of plane rotation angles) may also be registered.

Figure 9:
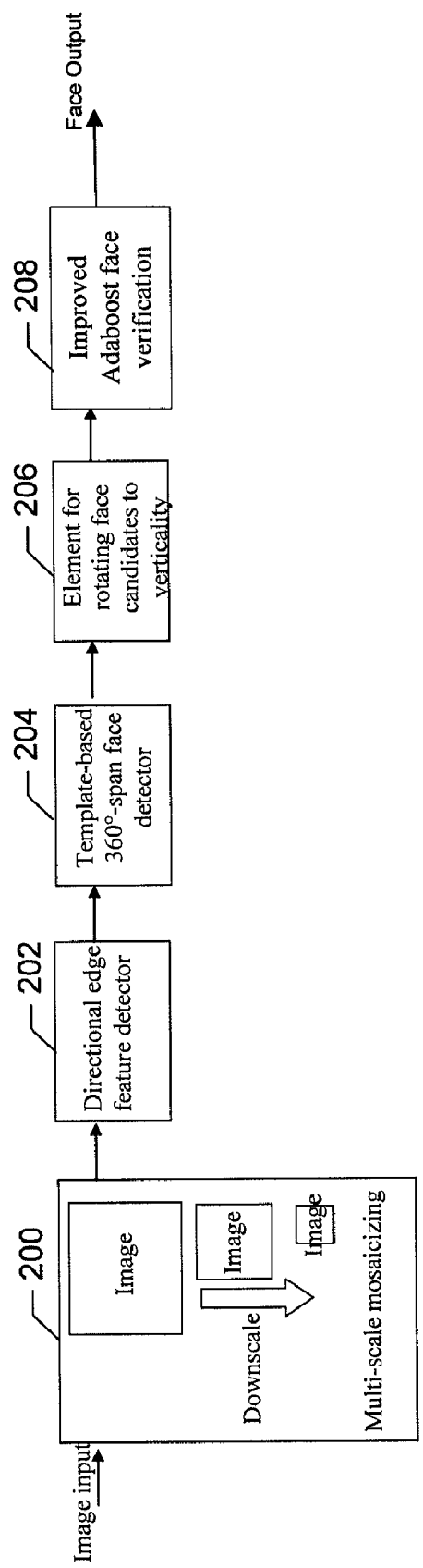
FIG. 9 shows a block diagram of operations performed in accordance with one exemplary embodiment of the present invention.

FIG. 9 shows a block diagram of operations performed in accordance with one exemplary embodiment of the present invention. In this regard, for example, at operation 200, the input image may be downscaled and multi-scale mosaiced by the image modifier 80. The edge detector 82 may then perform directional edge feature detection at operation 202. At operation 204, the face detector 84 may perform template-based 360 degree span face detection. At operation 206, the candidate rotator 86 may rotate face candidates vertically. The verifier 88 may then, for example, utilize improved Adaboost to verify candidate faces in order to produce a face output at operation 208.

Accordingly, some embodiments of the present invention provide for face detection on a feature-level instead of on a pixel-level. Accordingly, detection speed may be increased. In some cases, face scales do not need to be set ahead of time. Instead, face scales can be automatically computed from the eye pairs and a detected mouth from edge feature maps. Once a face is detected, the two eyes on the face can be accurately located. Some embodiments of the present invention also provide for 360 degree in-plane face detection achievement by taking advantage of four groups of edge feature maps (e.g., 0, 45, 90 and 135 degrees). Furthermore, some embodiments that employ the verifier 88 provide reduced false alarming.

Figure 10:
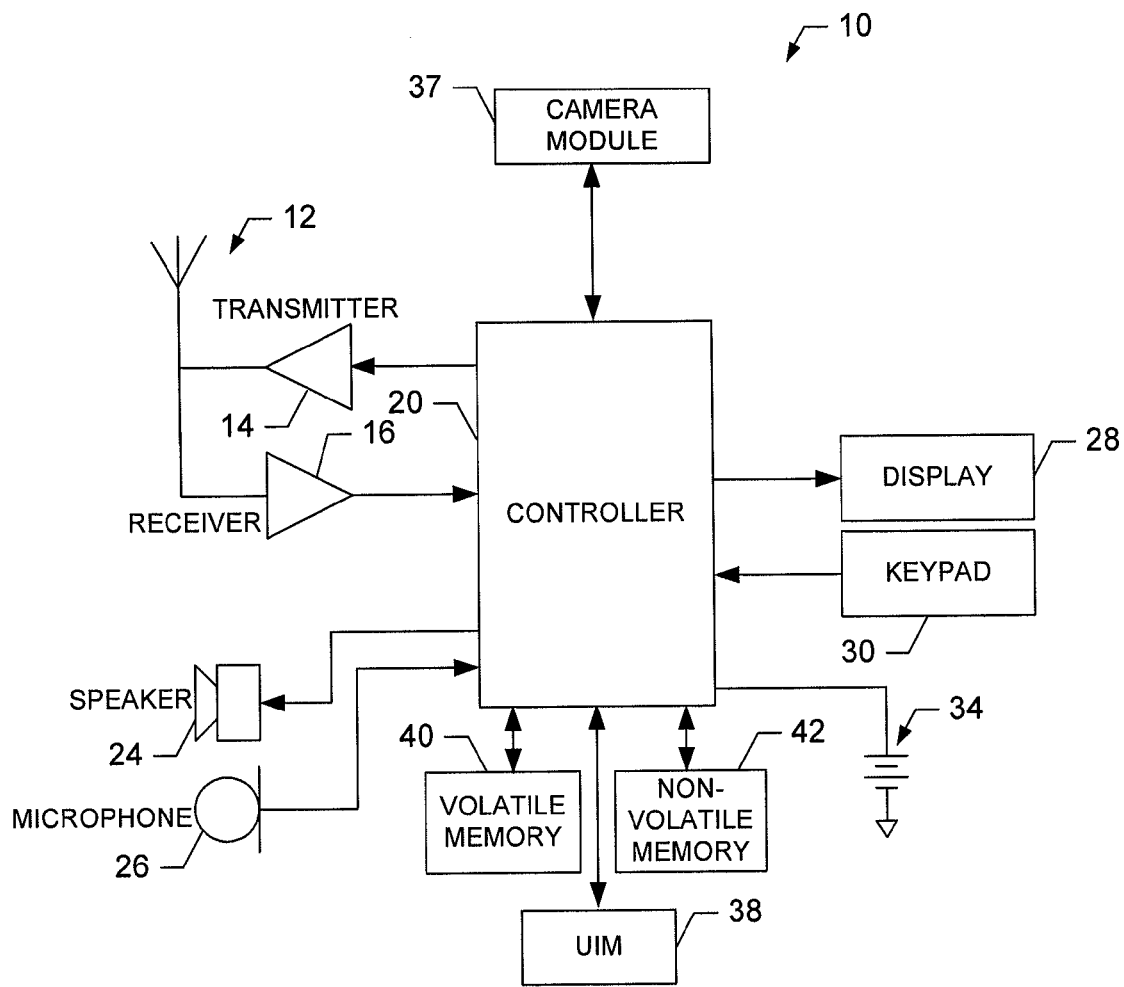
FIG. 10 illustrates a block diagram of a mobile terminal that may benefit from exemplary embodiments of the present invention.

As indicated above, some embodiments of the present invention may be practiced on mobile or fixed devices. An example of a mobile device on which embodiments of the present invention may be utilized is shown in FIG. 10. In this regard, FIG. 10 illustrates a block diagram of a mobile terminal 10 that may benefit from exemplary embodiments of the present invention. It should be understood, however, that a mobile terminal as illustrated and hereinafter described is merely illustrative of one type of mobile terminal that may benefit from some embodiments of the present invention and, therefore, should not be taken to limit the scope of embodiments of the present invention. Several types of mobile terminals, such as portable digital assistants (PDAs), pagers, mobile televisions, gaming devices, all types of computers (e.g., laptops or mobile computers), cameras, audio/video players, radio, global positioning system (GPS) devices, or any combination of the aforementioned, and other types of communications systems, can readily employ embodiments of the present invention.

In one exemplary embodiment, the mobile terminal 10 includes an antenna 12 (or multiple antennas) in operable communication with a transmitter 14 and a receiver 16. The mobile terminal 110 may further include an apparatus, such as a controller 20 (e.g., processor 70) or other processing element, that provides signals to and receives signals from the transmitter 14 and receiver 16, respectively. The signals, in some cases, include signaling information in accordance with the air interface standard of the applicable cellular system, and/or may also include data corresponding to speech, received data and/or user generated/transmitted data. In this regard, for example, the mobile terminal 10 may be capable of operating with one or more air interface standards, communication protocols, modulation types, and access types. By way of illustration, the mobile terminal 10 may be capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as E-UTRAN (evolved-universal terrestrial radio access network), with fourth-generation (4G) wireless communication protocols or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

In an exemplary embodiment, the controller 20 includes circuitry for implementing, among others, audio/video and logic functions of the mobile terminal 10. For example, the controller 20 may comprise a digital signal processor device, a microprocessor device, and various analog to digital converters, digital to analog converters, and/or other support circuits. Control and signal processing functions of the mobile terminal 10 may be allocated between these devices according to their respective capabilities. The controller 20 thus may also include the functionality to encode and interleave message and data prior to modulation and transmission. The controller 20 may additionally include an internal voice coder, and may include an internal data modem. In some cases, the controller 20 further includes functionality to operate one or more software programs, which may be stored in memory. For example, the controller 20 may be capable of operating a connectivity program, such as a conventional web browser. The connectivity program may then allow the mobile terminal 10 to transmit and receive web content, such as location-based content and/or other web page content, according to a Wireless Application Protocol (WAP), Hypertext Transfer Protocol (HTTP) and/or the like, for example.

The mobile terminal 10 may also comprise a user interface including an output device such as an earphone or speaker 24, a microphone 26, a display 28, and a user input interface, which may be operationally coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include numeric (0-9) and related keys (#, *), and other hard and soft keys used for operating the mobile terminal 10. Alternatively, in some embodiments, the keypad 30 includes a QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 134, such as a vibrating battery pack, for powering various circuits that are used to operate the mobile terminal 10, as well as optionally providing mechanical vibration as a detectable output.

In some embodiments, the mobile terminal 110 further includes a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. In some cases, the UIM 38 stores information elements related to a mobile subscriber. In addition to the UIM 38, the mobile terminal 10 may be equipped with memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 142, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10. Furthermore, the memories may store instructions for determining cell id information. Specifically, the memories may store an application program for execution by the controller 20, which determines an identity of the current cell, i.e., cell id identity or cell id information, with which the mobile terminal 10 is in communication.

In an exemplary embodiment, the mobile terminal 10 may include a media capturing module, such as a camera, video and/or audio module, in communication with the controller 20. The media capturing module may be any means for capturing an image, video and/or audio for storage, display or transmission. For example, in an exemplary embodiment in which the media capturing module is a camera module 37, the camera module 37 may include a digital camera capable of forming a digital image file from a captured image. As such, the camera module 37 may include all hardware, such as a lens or other optical device, and software necessary for creating a digital image file from a captured image.

Figure 11:
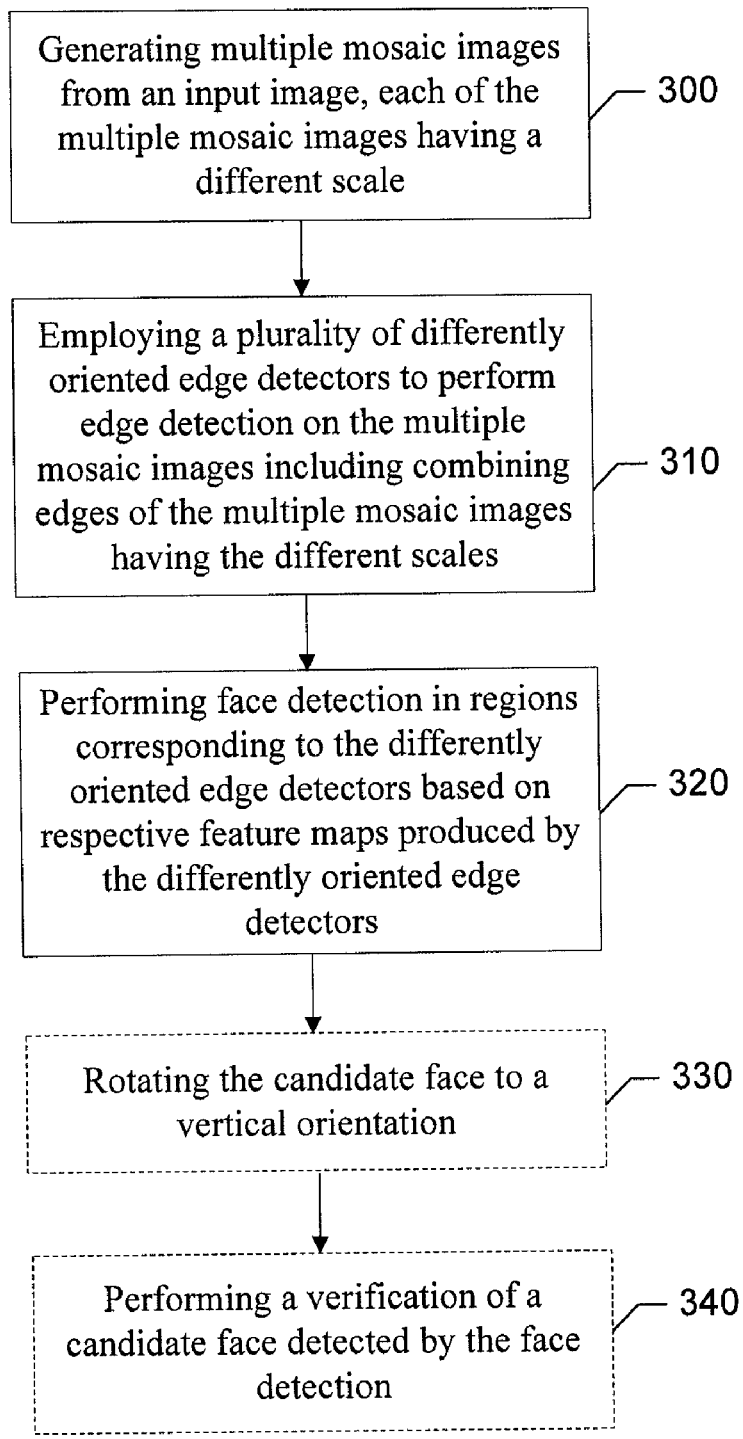
FIG. 11 is a flowchart according to an exemplary method for providing orientation independent face detection according to an exemplary embodiment of the present invention.

FIG. 11 is a flowchart of a system, method and program product according to some exemplary embodiments of the invention. It will be understood that each block or step of the flowchart, and combinations of blocks in the flowchart, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of a mobile terminal or other apparatus employing embodiments of the present invention and executed by a processor in the mobile terminal or other apparatus. As will be appreciated, any such computer program instructions may be loaded onto a computer or other programmable apparatus (i.e., hardware) to produce a machine, such that the instructions which execute on the computer (e.g., via a processor) or other programmable apparatus create means for implementing the functions specified in the flowchart block(s) or step(s). These computer program instructions may also be stored in a computer-readable memory that can direct a computer (e.g., the processor or another computing device) or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowchart, can be implemented by special purpose hardware-based computer systems which perform the specified functions or steps, or combinations of special purpose hardware and computer instructions.

In this regard, one embodiment of a method for providing orientation independent face detection as illustrated, for example, in FIG. 11 may include generating multiple mosaic images from an input image in which each of the multiple mosaic images has a different scale at operation 300. The method may further include employing a plurality of differently oriented edge detectors to perform edge detection on the multiple mosaic images including combining edges of the multiple mosaic images having the different scales at operation 310 and performing face detection in regions corresponding to the differently oriented edge detectors based on respective feature maps produced by the differently oriented edge detectors at operation 320.

In some embodiments, the method may include further optional operations, some examples of which are shown in dashed lines in FIG. 11. Optional operations may be performed in any order and/or in combination with each other in various alternative embodiments. As such, the method may further include an operation of rotating the candidate face to a vertical orientation at operation 340 and/or performing a verification of a candidate face detected by the face detection at operation 350.

In some embodiments, certain ones of the operations above may be modified or further amplified as described below. It should be appreciated that each of the modifications or amplifications below may be included with the operations above either alone or in combination with any others among the features described herein. In this regard, for example, performing the verification may include employing an Adaboost verification with greater than four kinds of haar-like features and/or employing bootstrapping with a punishment coefficient applied to samples proximate to a cascade margin. In some cases, employing the plurality of differently oriented edge detectors may include utilizing edge detectors oriented with equal amounts of angular separation between each edge detector and at least one other edge detector and oriented to cover three hundred and sixty degrees of possible in-plane rotation angles for candidate faces in respective swaths of equal size. In an exemplary embodiment, performing face detection may include employing an elastic face template to data in the respective feature maps to detect a candidate face based on features of the candidate face matching the elastic face template and/or employing an elastic face template having a width corresponding to a distance between eyes of a detected eye pair and a height corresponding to a distance between a line connecting the detected eye pair and a potential mouth of a candidate face. In some cases, generating multiple mosaic images may include averaging pixel values in each of a plurality of cell windows to generate a mosaic representation of the input image comprising the plurality of cell windows and utilizing multiple levels to binarize mosaic images having different scales.

In an exemplary embodiment, an apparatus for performing the method of FIG. 11 above may comprise a processor (e.g., the processor 70) configured to perform some or each of the operations (300-340) described above. The processor may, for example, be configured to perform the operations (300-340) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 300-340 may comprise, for example, the processor 70, image modifier 80, the edge detector 82, the face detector 84, the candidate rotator 86, the verifier 88, and/or an algorithm executed by the processor 70 for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   generating multiple mosaic images from an input image, each of the multiple mosaic images having a different scale;
   employing a plurality of differently oriented edge detectors to perform edge detection on the multiple mosaic images including combining edges of the multiple mosaic images having the different scales; and
   performing face detection in regions corresponding to the differently oriented edge detectors based on respective feature maps produced by the differently oriented edge detectors.

2. The method of claim 1, further comprising performing a verification of a candidate face detected by the face detection.

3. The method of claim 1, wherein employing the plurality of differently oriented edge detectors comprises utilizing edge detectors oriented with equal amounts of angular separation between each edge detector and at least one other edge detector and oriented to cover three hundred and sixty degrees of possible in-plane rotation angles for candidate faces in respective swaths of equal size.

4. The method of claim 1, wherein performing face detection comprises employing an elastic face template to data in the respective feature maps to detect a candidate face based on features of the candidate face matching the elastic face template.

5. The method of claim 1, wherein performing face detection comprises employing an elastic face template having a width corresponding to a distance between eyes of a detected eye pair and a height corresponding to a distance between a line connecting the detected eye pair and a potential mouth of a candidate face.

6. An apparatus comprising a processor and a memory device including instructions, the memory device and the instructions configured to, with the processor, cause the apparatus at least to:
   generate multiple mosaic images from an input image, each of the multiple mosaic images having a different scale;
   employ a plurality of differently oriented edge detectors to perform edge detection on the multiple mosaic images including combining edges of the multiple mosaic images having the different scales; and
   perform face detection in regions corresponding to the differently oriented edge detectors based on respective feature maps produced by the differently oriented edge detectors.

7. The apparatus of claim 6, wherein the processor is further configured to perform a verification of a candidate face detected by the face detection.

8. The apparatus of claim 7, wherein the processor is further configured to rotate the candidate face to a vertical orientation prior to performing the verification.

9. The apparatus of claim 7, wherein the processor is configured to perform the verification by employing an Adaboost verification with greater than four kinds of haar-like features.

10. The apparatus of claim 7, wherein the processor is configured to perform the verification by employing bootstrapping with a punishment coefficient applied to samples proximate to a cascade margin.

11. The apparatus of claim 6, wherein the processor is configured to employ the plurality of differently oriented edge detectors by utilizing edge detectors oriented with equal amounts of angular separation between each edge detector and at least one other edge detector and oriented to cover three hundred and sixty degrees of possible in-plane rotation angles for candidate faces in respective swaths of equal size.

12. The apparatus of claim 6, wherein the processor is configured to perform face detection by employing an elastic face template to data in the respective feature maps to detect a candidate face based on features of the candidate face matching the elastic face template.

13. The apparatus of claim 6, wherein the processor is configured to perform face detection by employing an elastic face template having a width corresponding to a distance between eyes of a detected eye pair and a height corresponding to a distance between a line connecting the detected eye pair and a potential mouth of a candidate face.

14. The apparatus of claim 6, wherein the processor is configured to generate multiple mosaic images by averaging pixel values in each of a plurality of cell windows to generate a mosaic representation of the input image comprising the plurality of cell windows and utilizing multiple levels to binarize mosaic images having different scales.

15. The apparatus of claim 6, wherein the processor is configured to perform face detection by employing multiple thresholds on respective ones of the mosaic images to generate corresponding different feature maps for face detection.

16. A computer program product comprising at least one non-transitory computer-readable storage medium having computer-executable program code instructions stored therein, the computer-executable program code instruction comprising:
   program code instructions for generating multiple mosaic images from an input image, each of the multiple mosaic images having a different scale;
   program code instructions for employing a plurality of differently oriented edge detectors to perform edge detection on the multiple mosaic images including combining edges of the multiple mosaic images having the different scales; and
   program code instructions for performing face detection in regions corresponding to the differently oriented edge detectors based on respective feature maps produced by the differently oriented edge detectors.

17. The computer program product of claim 16, further comprising program code instructions for performing a verification of a candidate face detected by the face detection.

18. The computer program product of claim 16, wherein program code instructions for employing the plurality of differently oriented edge detectors include instructions for utilizing edge detectors oriented with equal amounts of angular separation between each edge detector and at least one other edge detector and oriented to cover three hundred and sixty degrees of possible in-plane rotation angles for candidate faces in respective swaths of equal size.

19. The computer program product of claim 16, wherein program code instructions for performing face detection include instructions for employing an elastic face template having a width corresponding to a distance between eyes of a detected eye pair and a height corresponding to a distance between a line connecting the detected eye pair and a potential mouth of a candidate face.

20. An apparatus comprising:
   means for generating multiple mosaic images from an input image, each of the multiple mosaic images having a different scale;
   means for employing a plurality of differently oriented edge detectors to perform edge detection on the multiple mosaic images including combining edges of the multiple mosaic images having the different scales; and
   means for performing face detection in regions corresponding to the differently oriented edge detectors based on respective feature maps produced by the differently oriented edge detectors.

* * * * *